(12) United States Patent
Voyer

(10) Patent No.: US 6,961,542 B2
(45) Date of Patent: Nov. 1, 2005

(54) METHOD OF ESTIMATING A DOWNLINK CHANNEL

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 624 days.

(21) Appl. No.: 09/971,706

(22) Filed: Oct. 9, 2001

(65) Prior Publication Data

US 2002/0058479 A1 May 16, 2002

(30) Foreign Application Priority Data

Oct. 18, 2000 (FR) .............................................. 00 13420

(51) Int. Cl.⁷ .............................................. H04B 17/00
(52) U.S. Cl. ........................ 455/67.11; 455/69; 455/70
(58) Field of Search ................................ 455/423–425, 455/522, 67.11, 67.13, 67.16, 69, 70, 115.1–115.4, 226.1–277.1

(56) References Cited

U.S. PATENT DOCUMENTS 5,592,490 A   1/1997 Barratt et al.
6,615,024 B1 * 9/2003 Boros et al. .............. 455/67.14

FOREIGN PATENT DOCUMENTS

WO   WO 99/14870   3/1999
WO   WO 99/57820   11/1999

* cited by examiner

*Primary Examiner*—Duc Nguyen
(74) *Attorney, Agent, or Firm*—Oblon, Spivak, McClelland, Maier & Neustadt, P.C.

(57) ABSTRACT

A method of estimating a downlink channel between a base station and a mobile terminal in a mobile telecommunication system. In the method the base station estimates the uplink channel between the mobile terminal and the base station, deduces, from the variations in the uplink channel, variations in the down link channels, makes an initial estimation of the down link channel at a first instant, and estimates at a second instant the downlink channel from the initial estimation at the first instant and variations in the downlink channel between the first and second instants.

10 Claims, 3 Drawing Sheets

METHOD OF ESTIMATING A DOWNLINK CHANNEL

BACKGROUND OF THE INVENTION

1. Field of the Invention

The present invention concerns in general terms a method of estimating a channel in a mobile telecommunication system and more particularly a method of downlink channel estimation by a base station.

2. Discussion of the Background

In a mobile telecommunication system, base station transmits signals to mobile terminals and receives signals from the mobile terminals. The transmission channels from the base station to the mobile terminals are called downlink channels and conversely the transmission channels from the mobile terminals to the base station are called uplink channels. Each transmission channel, uplink or downlink, comprises a variety of paths between a transmitter and a receiver, each path being characterised by a delay, a direction of arrival, an attenuation and a phase rotation. The effect of the attenuation and phase rotation can be modelled simply by a complex multiplicative coefficient characteristic of the path.

It is known that an array of antennae can be used for forming beams and/or for cancelling interference in one or more directions. The antenna processing consists of a weighting of the outputs of the different antennae by complex coefficients followed by an adding of the weighted outputs, the coefficients being chosen so as to obtain the required equivalent antenna diagram. It is thus possible to form a beam in the directions of arrival of the useful signal whilst placing zeros in the directions of arrival of the interfering signals. Beam formation (also referred to as channel formation), has been applied to mobile telephony, notably in order to direct a reception beam from a base station to a mobile terminal (up link). The base station is then equipped with an adaptive antenna (referred to as an "intelligent antenna") capable of pointing in the directions of arrival of the paths of propagation of a signal transmitted by a mobile terminal.

When a mobile telephony system functions according to a code division multiple access (CDMA) mode, the signals coming from the different mobile terminals are separated by filterings adapted to the signatures of the different users. The signatures employed must have good correlation properties, namely low intercorrelation values and a very pronounced autocorrelation peak.

The first of these two characteristics makes it possible to separate the signals coming from the different users. Naturally, in practice, this separation is not perfect and depends on a factor of orthogonality between the different transmission channels.

The second characteristic makes it possible amongst other things to separate in time the correlation peaks output from the adaptive filtering and therefore to isolate the signals of a user being propagated on different paths. In order to improve the signal to noise ratio, the diversity of paths can be exploited by combining these signals in a rake receiver. The complex coefficients used in the different branches of the receiver are chosen so as to be equal to the conjugates of the complex multiplicative coefficients introduced by the paths concerned. To this end, the receiver effects an estimation of the uplink channel. In practice, it determines, by means of pilot symbols transmitted by the mobile terminal, the coefficients of attenuation and the phase rotations undergone by the signal along the paths constituting the channel. The resulting filtering operation is a filtering adapted to the equivalent filter of the channel.

In addition to the uplink channel estimation, it maybe advantageous to have available at the base station an estimation of the downlink channel. This is because the base station can then transmit, in the direction of the uplink paths, signals precompensated for phase so that they are in phase again at the mobile terminal. Such a precompensation has the advantage of improving the signal to noise ratio on reception.

In order to have an estimation of the downlink channel at the base station, it can be envisaged estimating this at the mobile terminal and transmitting the estimate obtained to the base station. However, when the channel exhibits rapid variations in its transfer function, for example when the mobile terminal is moving rapidly, the estimation must be transmitted very frequently, which uses very significant conveying resources. Naturally, conversely, if the estimation is transmitted infrequently, the base station will not be able to follow the change in the downlink channel and will therefore not be able to correctly effect the phase precompensation.

SUMMARY OF THE INVENTION

The purpose of the invention is to propose a method of estimation of a downlink channel by the base station not requiring the transmission of a large quantity of information by the mobile terminal.

To this end, the invention is defined by a method of estimating a downlink channel by the base station and a mobile terminal in a mobile telecommunication system, according to which the said base station estimates the uplink channel between the said mobile terminal and the said base station, deduces variations in the uplink channel and those in the downlink channel, and estimates at a second instant the said downlink channel from an initial estimation at a first instant and variations in the said downlink channel between the said first and second instants.

The initial estimation of the downlink channel is for example obtained by the mobile terminal and transmitted by it to the base station.

According to a first embodiment, the estimation of the uplink channel comprises, for each propagation path (i) of the said channel, the estimation of a first complex multiplicative coefficient ($c_i^u$) representing the attenuation and phase rotation undergone by a signal at a first frequency ($f_u$) propagating along the said path and the estimation of the downlink channel comprises, of each of the same paths, the estimation of a second complex multiplicative coefficient ($c_i^d$) representing the attenuation and phase rotation undergone by a signal at a second frequency ($f_d$) propagating along the said path.

Advantageously, for a given path (i) and a given interval of time ($\Delta t$) the variation in the second complex multiplicative coefficient ($\Delta c_i^d$) during the said interval of time is calculated from the variation in the first complex multiplicative coefficient ($\Delta c_i^u$) during the said interval of time according to: $\Delta c_i^d / c_i^d = f_d / f_u \cdot \Delta c_i^u / c_i^u$.

The second complex multiplicative coefficients ($c_i^d$) of the different paths can be obtained by adding over time their respective variations ($\Delta c_i^d$) and initial values ($c_i^d(0)$) transmitted by the mobile terminal.

According to a second embodiment, the estimation of the uplink channel comprises, for each direction ($\theta_k$) belonging to a plurality (N) of directions angularly sampling a zone served by the said base station, the estimation of a first complex multiplicative coefficient ($c_k^u$) representing the attenuation and the phase rotation undergone by a signal at a first frequency ($f_u$) transmitted by the mobile terminal and arriving at the said base station substantially in the said direction, and the estimation of the downlink channel comprises, for each of the said directions ($\theta_k$), the estimation of a second complex multiplicative coefficient ($c_k^d$) representing the attenuation and phase rotation undergone by a signal at a second frequency ($f_d$) transmitted by the said base station in this direction to the said mobile terminal.

Advantageously, for a given direction ($\theta_k$) and a given interval of time ($\Delta t$), the variation in the second complex multiplicative coefficient ($\Delta c_k^d$) during the said interval of time is calculated from the variation in the first complex multiplicative coefficient ($\Delta c_k^u$) during the said interval of time according to: $\Delta c_k^d / c_k^d = f_d / f_u \cdot \Delta c_k^u / v_k^u$.

The second complex multiplicative coefficients ($c_k^d$) in the different directions can be obtained by adding over time their respective variations ($\Delta c_k^d$) and initial values ($c_k^d(0)$) transmitted by the mobile terminal.

The invention is also defined by a device for estimating a downlink channel intended to be mounted in a base station in a mobile telecommunication system and comprising means for implementing the method as just disclosed.

BRIEF DESCRIPTION OF THE FIGURES

The characteristics of the invention mentioned above, as well as others, will emerge more clearly from a reading of the following description in relation to the accompanying figures, amongst which.

DESCRIPTION OF THE PREFERRED EMBODIMENTS

The general idea at the basis of the invention is to propose a method of estimating the downlink channel from an estimation of the uplink channel and possibly updating information transmitted by the mobile terminal.

Figure 1:
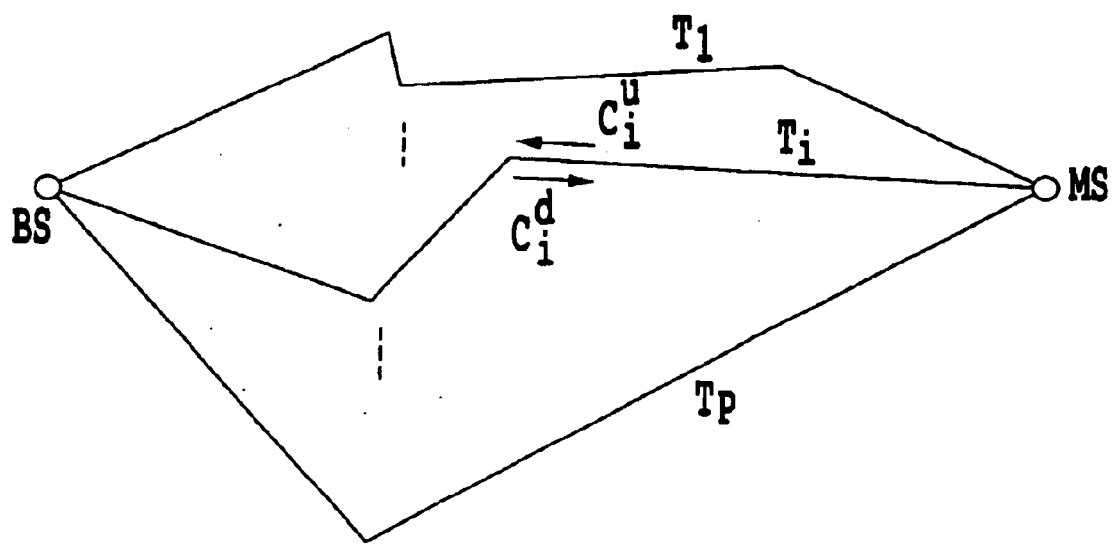
FIG. 1 depicts schematically a transmission channel between a base station and a mobile terminal.

FIG. 1 depicts a transmission channel between a base station and a mobile terminal. The channel comprises a plurality of paths $T_1, T_2, \ldots, T_P$, each path i introducing an attenuation and phase rotation of the signal S which can be modelled by a complex multiplicative coefficient $c_i = \alpha i \cdot \exp(jv_i + j\phi_i)$ where $\alpha_i$ is the coefficient of the path i, $v_i = 2\pi f L_i/c$ is the phase rotation on the said path, $L_i$ is the length of the path, c the speed of propagation of light, f is the frequency used, and $\phi_i$ is the polarisation of the incident signal.

It will be assumed hereinafter that the paths of the uplink channel are identical to those of the downlink channel. The signal received by the base station and the one received by the mobile terminal are then expressed respectively by:

$$R_u = \left[\sum_{i=1}^{P} \alpha_i \cdot \exp - j(2\pi f_u \cdot L_i / c + \varphi_i)\right] \cdot S_u \quad (1)$$

$$R_d = \left[\sum_{i=1}^{P} \alpha_i \cdot \exp - j(2\pi f_d \cdot L_i / c + \varphi_i)\right] \cdot S_d \quad (2)$$

where $S_u$ and $R_u$ are respectively the signal transmitted and the signal received over the up link,
$S_d$ and $R_d$ are respectively the signal transmitted and the signal received over the down link,
$F_d$ and $f_u$ the frequencies used respectively on the down link and the up link. The complex multiplicative coefficients relating to the path i of the uplink channel and downlink channel respectively will be denoted $c_i^u = \alpha i \cdot \exp - j(2\pi f_u . L_i/c + \phi_i)$ and $c_i^d = \alpha i \cdot \exp - j(2\pi f d . L_i/c + \phi_i)$.

Figure 2:
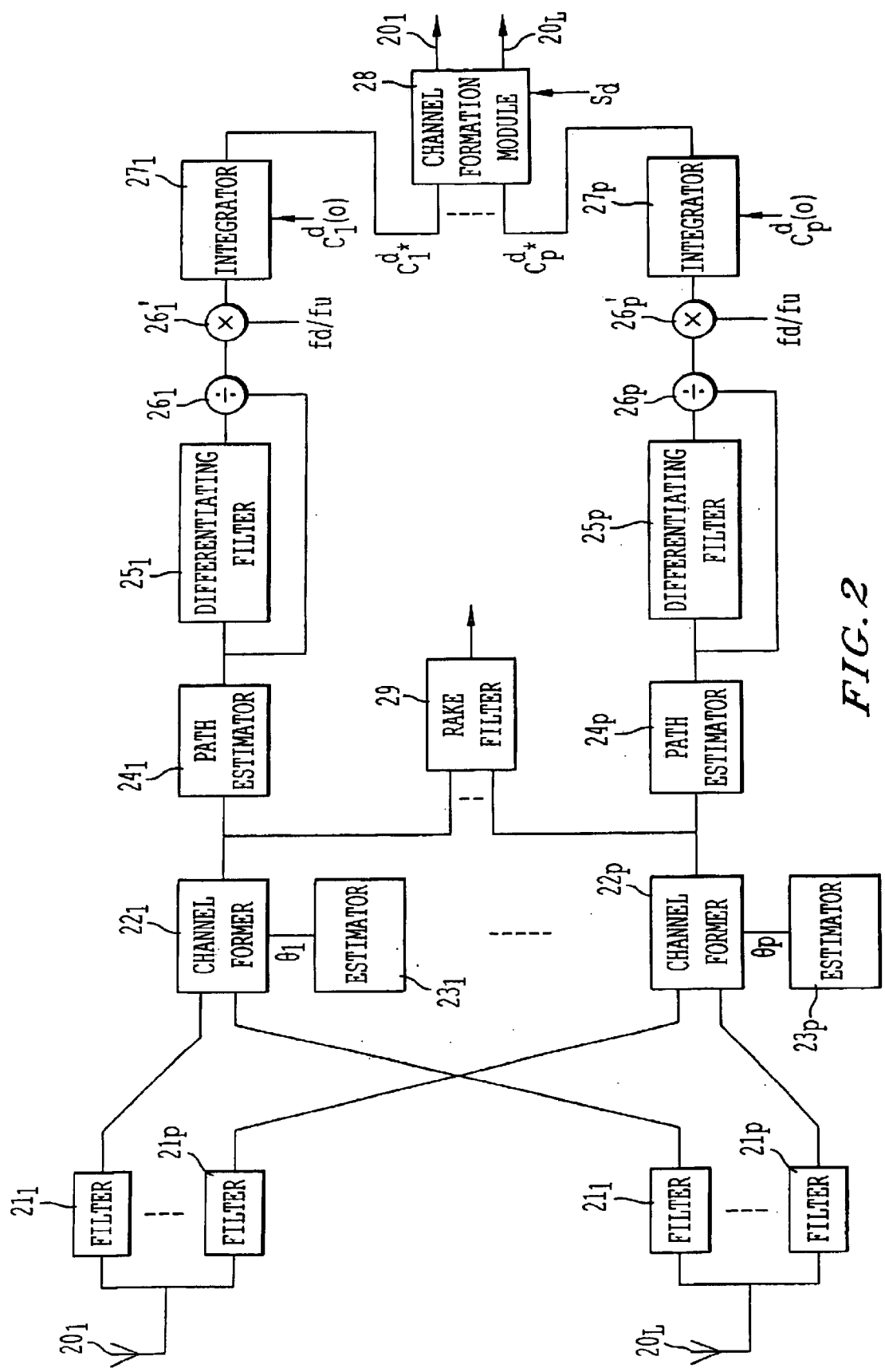
FIG. 2 depicts schematically a first embodiment of the invention.

FIG. 2 illustrates a base station receiver accordingly to a first embodiment of the invention. The device comprises an array of antennae ($20_1$), ..., ($20_L$), for example a linear array or a uniform circular array, each antenna output being filtered by a battery of filters ($21_1$), ..., ($21_P$) adapted to the signature of the user and to the different paths i=1.P. The output signals of the filters corresponding to one and the same path i are weighted and added in channel formers ($22_1$), ..., ($22_P$). The channel formers ($22_i$) form beams in the directions of arrival of the paths i=1.P. To do this, they receive from the estimators ($23_1$), ..., ($23_P$) the estimated values, $\theta f$, of the directions of arrival of the different paths. The outputs of the channel formers are then subjected to a combination (MRC) in a rake filter (29). An estimation of the complex multiplicative coefficients, $c_i^u$, relating to the different paths of the uplink channel is effected by path estimators ($24_1$), ..., ($24_P$) receiving the output signals from the channel formers ($22_1$), ..., ($22_P$). The multiplicative coefficients $c_i^u$ can, for example, be determined conventionally by means of pilot symbols transmitted by the mobile terminal. Advantageously, the estimation of the multiplicative coefficients and the directions of arrival will be effected conjointly, as described in French present application n°00 11160 filed on Aug. 29, 2000 in the name of applicant. The coefficients $c_i^u$ are transmitted to differentiating filters ($25_1$), ..., ($25_P$) and their complex conjugates to the rake filter (29). The differentiating filters ($25_i$) calculate respectively:

$$\Delta c_i^u = \frac{\partial c_i^u}{\partial t} \cdot \Delta t \quad (3)$$
$$= \left[\frac{\partial \alpha_i}{\partial t} \cdot \exp\left(-j(2\pi f_u L_i / c + \varphi_i) - j \cdot (2\pi f_u L_i / c) \cdot c_i^u \cdot \frac{\partial L_i}{\partial t}\right)\right]\Delta t$$

where $\Delta t$ is the interval of time between two consecutive estimations $c_i^u$, an expression which can be approximated by:

$$\Delta c_i^u \approx -j \cdot (2\pi f_u L_i / c) \cdot c_i^u \cdot \frac{\partial L_i}{\partial t} \Delta t \quad (4)$$

if it is considered that the coefficients of attenuation on the different paths vary little during the interval of time $\Delta t$. These values are divided as ($26_1$), ..., ($26_P$) by the complex coefficients $c_i^u$ and then multiplied by the coefficient $f_d/f_u$ as ($26'_1$), ..., ($26'_P$) and transmitted to the integrators ($27_1$), ..., ($27_P$). These integrators make the following calculation:

$$c_i^d(t + \Delta t) = c_i^d(t)(1 + \eta_i(t) \cdot \Delta t) \quad (5)$$

where $\eta_i(t)$ is the output of the multiplier ($26_i$) and $c_i^d(0)$ are P initial values transmitted by the mobile terminal. In order to avoid any difference due to integration, an estimation of the $c_i^d$ values is effected and transmitted at regular intervals by the mobile terminal, the integrators (27$_i$) being reinitialised at each refreshing. The refresh frequency is chosen so that as to be sufficient although not to give rise to an excessively high transmission rate on the up link.

This gives:

$$\Delta c_i^d = -j \cdot (2\pi f_d L_i / c) \cdot c_i^d \cdot \frac{\partial L_i}{\partial t} \Delta t \quad (6)$$

The values $c_i^d$ are transmitted to a phase precompensation and channel formation module (28). This module calculates, from a signal $S_d$ to be transmitted over the downlink channel, phase-precompensated signals $c_i^{d^*}.S_d$. Each precompensated signal $c_i^{d^*}.S_d$ is then weighted by antenna coefficients so as to form a transmission beam in the direction θi of the corresponding incident path. If it is assumed that the paths of the downlink channel are identical to those of the uplink channel, the precompensated signals arrive in phase at the mobile terminal, which improves the signal to noise ratio on reception.

Figure 3:
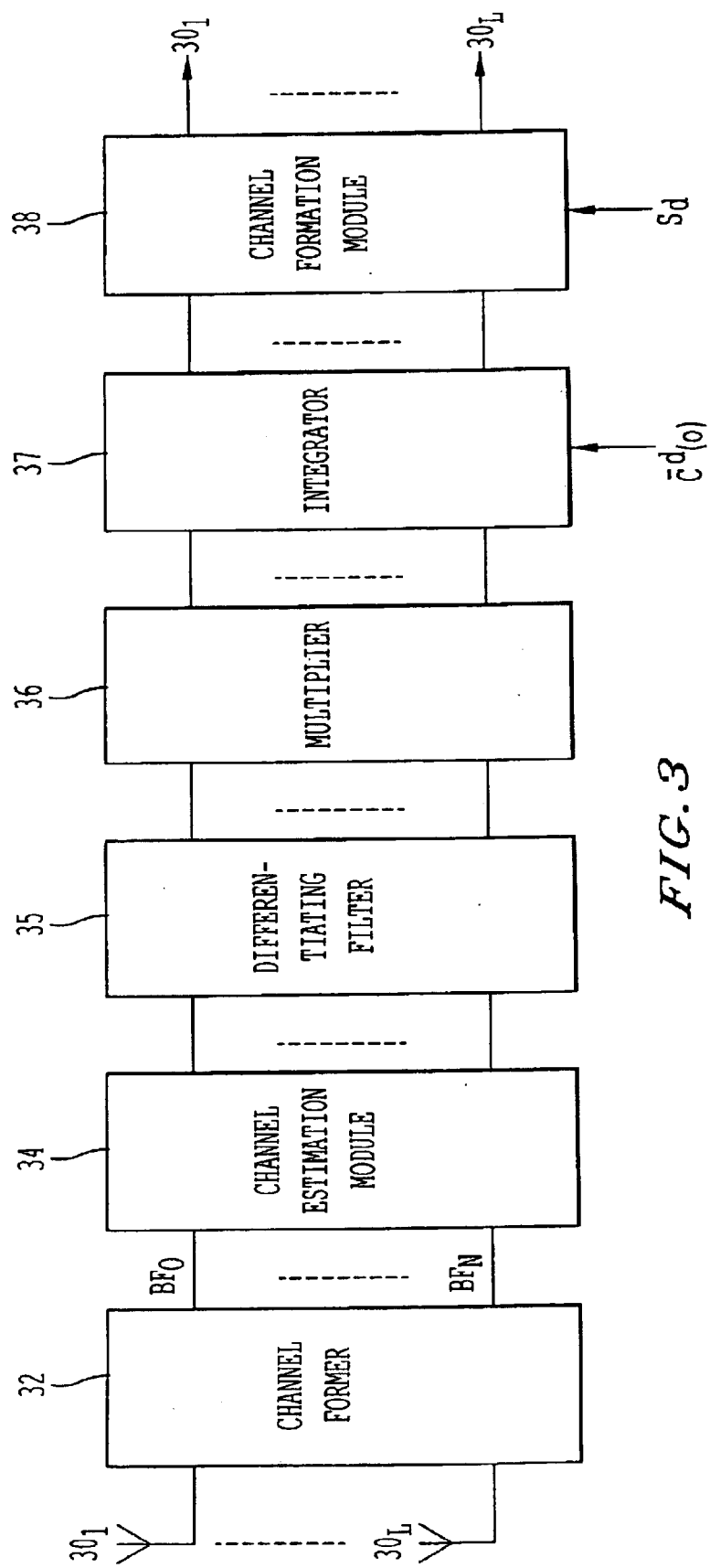
FIG. 3 depicts schematically a second embodiment of the invention.

FIG. 3 illustrates a base station receiver according to a second embodiment of the invention. The device comprises an array of antennae (30$_1$), ..., (30$_L$) and a channel former (32) forming beams in N directions angularly sampling a zone served by the base station, for example, for a linear network, in the equidistributed directions $\theta_k$=k.π/N, k=0, ..., N-1. The uplink channel can be modelled by a vector with N components $\overline{C}^u$=(c$_0^u$, c$_1^u$, ..., c$_{N-1}^u$)$^T$ where $c_k^u$=α$_k$.exp-j(2πf$_u$.L$_k$/c+φ$_k$) if the channel has a path of length L$_k$ in the direction $\theta_k$ and $c_k^u$=0 otherwise. Likewise, the downlink channel can be modelled by a vector $\overline{C}^d$=(c$_0^d$, c$_1^d$, ..., c$_{N-1}^d$)$^T$ where $c_k^d$=α$_k$.exp-j(2πf$_d$.L$_k$/c+φ$_k$) and $c_k^d$=0 with the same convention. channel former (32) are supplied to a channel estimation module (34) estimating the components of the vector $\overline{C}^u$. The components of this vector are then transmitted to a differentiating filter (35) evaluating the variation in the vector $\overline{C}^u$ during the time interval $\Delta t$ separating two consecutive estimations. The variation in this vector can be written $\overline{\Delta c}^u$=($\Delta c_0^u$, $\Delta c_1^u$, ..., $\Delta c_{N-1}^u$)$^T$ where $$\Delta c_k^u = -j \cdot (2\pi f_u L_k / c) \cdot c_k^u \cdot \frac{\partial L_k}{\partial t} \Delta t$$

with the same assumption as that made at (4). The vector $\overline{\Delta c}^u$ is then multiplied at (36) by the matrix M=Diag(f$_d$/f$_u$.1/c$_k^u$). The vector thus obtained, $\overline{\Delta c}^d$, is transmitted to an integrator (7) which performs the calculations of the components $c_k^d$ of the vector $\overline{C}^d$ by: $c_k^d$(t+$\Delta$t)=$c_k^d$(t)(1+η$_k$(t).$\Delta$t). The integrator is regularly reinitialised with a refresh vector $\overline{C}^d$(0) whose non-zero components are the estimations $c_k^d$ supplied by the mobile terminal in the path directions $\theta_k$. The vector $\overline{C}^{d^*}$ of the conjugate components $c_k^{d^*}$ is then transmitted to a phase precompensation and channel formation module in the directions $\theta_k$. In similar manner to the previous embodiment, this module calculates, from a signal $S_d$ to be transmitted over the downlink channel, phase-precompensated signals $c_k^{d^*}.S_d$. Each precompensated signal $c_k^{d^*}.S_d$ is then weighted by antenna coefficients so as to form a transmission beam in the direction $\theta_k$.

The device described above has been depicted, for reasons of simplicity, in the form of functional modules. It goes without saying, however, that the various functions can be executed by a processor programmed for this purpose or by a plurality of dedicated processors.

What is claimed is:

1. A method of estimating a downlink channel between a base station and a mobile terminal in a mobile telecommunication system, comprising:
   estimating at the base station an uplink channel between the mobile terminal and the base station;
   deducing, from variations in the estimated uplink channel, variations in a downlink channel;
   making an initial estimation of the downlink channel at a first instant; and
   estimating at a second instant the downlink channel from the initial estimation of the downlink channel at the first instant and the deduced variations in the downlink channel between the first and second instants.

2. The estimation method according to claim 1, wherein the initial estimation of the downlink channel is obtained by the mobile terminal and transmitted by the mobile terminal to the base station.

3. A method of estimating a downlink channel between a base station and a mobile terminal in a mobile telecommunication system, comprising:
   estimating at the base station an uplink channel between the mobile terminal and the base station;
   deducing, from variations in the estimated uplink channel, variations in a downlink channel;
   making an initial estimation of the downlink channel at a first instant; and
   estimating at a second instant the downlink channel from the initial estimation of the downlink channel at the first instant and the deduced variations in the downlink channel between the first and second instants,
   wherein the estimating the uplink channel comprises, for each propagation path (i) of the channel, estimating a first complex multiplicative coefficient ($c_i^u$) representing attenuation and phase rotation undergone by a signal at a first frequency ($f_u$) propagating on the path, and wherein the estimating the downlink channel comprises, for each of the same paths, estimating a second complex multiplicative coefficient ($c_i^d$) representing attenuation and phase rotation undergone by a signal at a second frequency (f) propagating on the path.

4. The estimation method according to claim 3, wherein the initial estimation of the downlink channel is obtained by the mobile terminal and transmitted by the mobile terminal to the base station.

5. The method according to claim 3, wherein, for a given path (i) and a given interval of time ($\Delta$t), variation in the second complex multiplicative coefficient ($\Delta c_i^d$) during the interval of time is calculated from the variation in the first complex multiplicative coefficient ($\Delta c_i^u$) during the said interval of time according to:

$$\Delta c_i^d / c_i^d = f_d / f_u \cdot \Delta c_i^u / c_i^u.$$

6. The estimation method according to claim 5, wherein the second complex multiplicative coefficients ($c_i^d$) of the different paths are obtained by adding over time their respective variations ($\Delta c_i^d$) and initial values ($c_i^d$(0)) transmitted by the mobile terminal.

7. A method of estimating a downlink channel between a base station and a mobile terminal in a mobile telecommunication system, comprising:
   estimating at the base station an uplink channel between the mobile terminal and the base station;
   deducing, from variations in the estimated uplink channel, variations in a downlink channel;

making an initial estimation of the downlink channel at a first instant; and estimating at a second instant the downlink channel from the initial estimation of the downlink channel at the first instant and the deduced variations in the downlink channel between the first and second instants, wherein the estimating the uplink channel comprises, for each direction ($\theta_k$) belonging to a plurality (N) of directions angularly sampling a zone served by the base station, estimating a first complex multiplicative coefficient ($c_k^u$) representing attenuation and phase rotation undergone by a signal at a first frequency ($f_u$), transmitted by the mobile terminal and arriving at the base station substantially in the direction, and wherein the estimating the downlink channel comprises, for each of the directions ($\theta_k$), estimating a second complex multiplicative coefficient ($c_k^d$) representing attenuation and phase rotation undergone by a signal at a second frequency ($f_d$) transmitted by the base station in the direction to the mobile terminal.

8. The estimation method according to claim 7, wherein the initial estimation of the downlink channel is obtained by the mobile terminal and transmitted by the mobile terminal to the base station.

9. The method according to claim 7, wherein, for a given direction ($\theta_k$) and a given interval of time ($\Delta_t$), the variation in the second complex multiplicative coefficient ($\Delta c_k^d$) during the interval of time is calculated from the variation in the first complex multiplicative coefficient ($\Delta c_k^u$) during the said interval of time according to:

$$\Delta c_k^d / c_k^d = f_d / f_u \cdot \Delta c_k^u / c_k^u.$$

10. The method according to claim 9, wherein the second complex multiplicative coefficients ($c_k^d$) in the different directions are obtained by adding over time their respective variations ($\Delta c_k^d$) and initial values ($c_k^d(0)$) transmitted by the mobile terminal.

* * * * *